United States Patent [19]

Hagen

[11] Patent Number: 4,552,514
[45] Date of Patent: Nov. 12, 1985

[54] WAVE DRIVEN WORK EXTRACTING DEVICE
[75] Inventor: Glenn E. Hagen, New Orleans, La.
[73] Assignee: Williams, Inc., New Orleans, La.
[21] Appl. No.: 591,050
[22] Filed: Mar. 19, 1984

Related U.S. Application Data
[62] Division of Ser. No. 515,471, Jul. 20, 1983.
[51] Int. Cl.⁴ .................... F04B 17/00; B01D 3/10
[52] U.S. Cl. ................................. 417/332; 202/180; 203/26; 203/DIG. 16
[58] Field of Search ............ 203/10, 11, 26, DIG. 20, 203/DIG. 16; 417/330–333, 100, 240; 60/500, 501; 290/53, 54; 202/180, 205, 177

[56] References Cited
U.S. PATENT DOCUMENTS

| | | | |
|---|---|---|---|
| 738,996 | 9/1903 | Hagen | 417/332 |
| 889,325 | 6/1908 | McNally | 417/332 |
| 1,074,060 | 9/1913 | Melander | 417/332 |
| 1,078,323 | 11/1913 | Trull | 417/332 |
| 4,077,213 | 3/1978 | Hagen | 60/500 |
| 4,098,084 | 7/1978 | Cockerell | 60/500 |
| 4,209,283 | 6/1980 | Marbury | 417/332 |
| 4,210,821 | 7/1980 | Cockerell | 60/500 X |
| 4,309,152 | 1/1982 | Hagen | 417/218 |

Primary Examiner—Wilbur Bascomb
Attorney, Agent, or Firm—Dula, Shields & Egbert

[57] ABSTRACT

A work extracting device driven by the wave motion of a fluid comprising a first float, a cylinder, a piston slidably engaging the interior of the cylinder, a piston rod extending from the piston and pivotally coupled to the first float, and a second float connected to the first float. The first float has a density suitable for floating and moves in response to wave motion. The cylinder is pivotally mounted to the second float. The first and second floats are part of a Hagen array of floats. The first float has an arm extending a distance beyond the point of connection of the first and second floats. The piston rod is pivotally mounted generally about the end of the arm.

2 Claims, 4 Drawing Figures

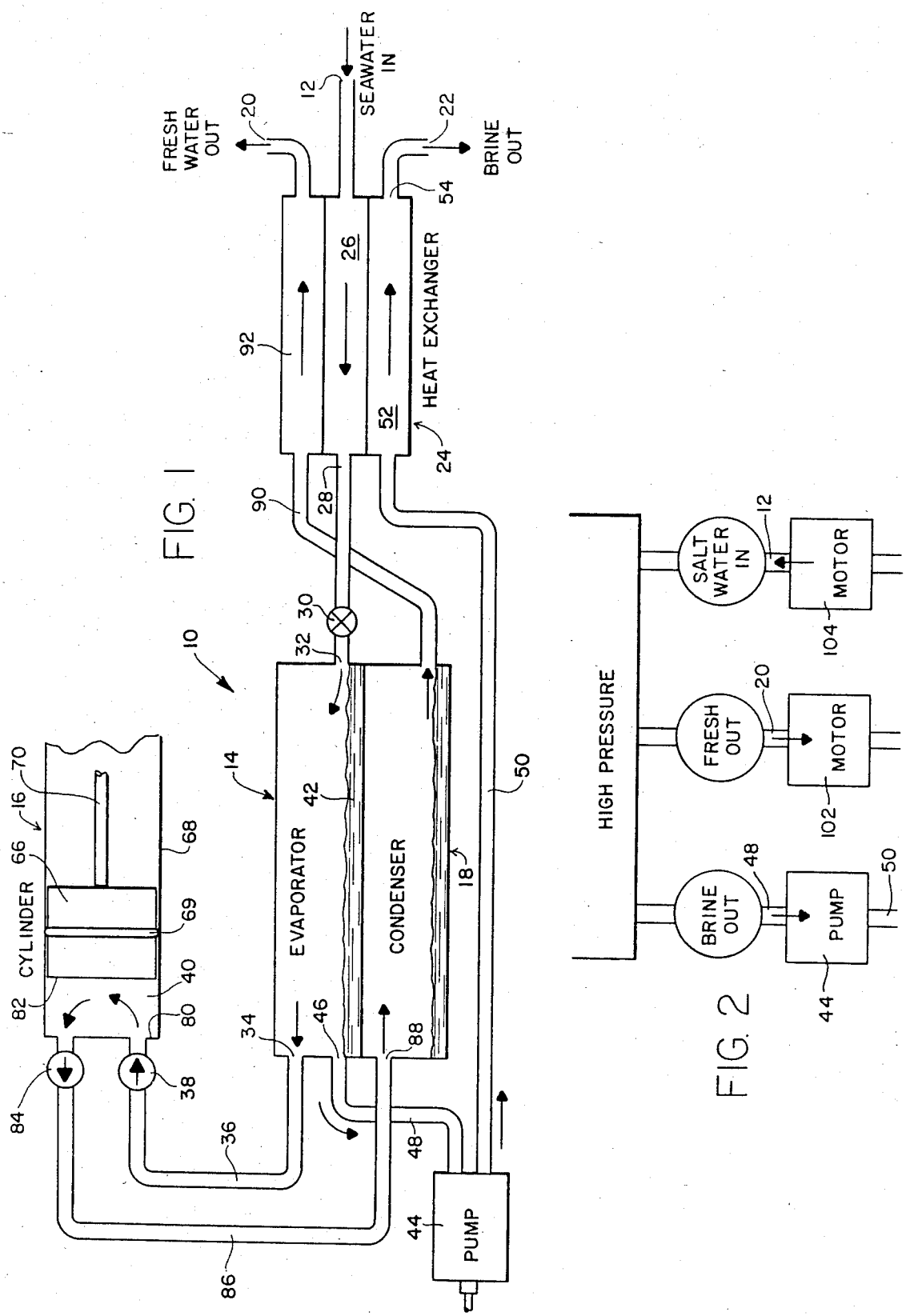

WAVE DRIVEN WORK EXTRACTING DEVICE

RELATED APPLICATIONS

This is a divisional application of co-pending application Ser. No. 515,471, filed on July 20, 1983.

TECHNICAL FIELD

The present invention relates to apparatus for extracting work from the wave motion of a fluid.

BACKGROUND ART

Many countries throughout the world have a vital need for obtaining fresh water from sea water. Typically, island-countries require either the distillation of sea water or the importation of fresh water in order to supply their needs. In many parts of the United States, there are critical water shortages that could be quickly remedied through the distillation of adjacent sea water. However, it has seldom been thought to be cost effective to distill sea water through presently available techniques. As a result, water importation into areas of need has been the typical solution for providing fresh water.

There are many areas of the world that have been relying on the use of oil or natural gas to obtain fresh water. For example, in the U.S. Virgin Islands, about half of the fresh water supply is produced through oil-fired stills. The other half of their fresh water supply is barged from Puerto Rico. These methods of obtaining fresh water are incredibly expensive.

Under presently available techniques, it is possible to distill sea water through application of wave energy. However, under such techniques, the wave energy is used to generate electricity which is, in turn, used to provide heat to the still. (See, for reference, U.S. Pat. No. 4,077,213 issued on March 7, 1978, to Glenn E. Hagen and U.S. Pat. No. Re. 31,111 of Dec. 28, 1982, issued to Glenn E. Hagen.) However, such electrical equipment is expensive, both in initial and maintenance costs.

Another concept would be to skip the electrical step and use the motion of floats on the surface of the sea to pump water vapor in a pressure-difference still. The temperature of the ocean's surface in the area of the Virgin Islands is about 33 degrees C. At that temperature, water will boil if subjected to a vacuum of about 30 millimeters absolute. This suggests that wave-powered cylinders could be used to create a 30 millimeter vacuum and allow the sea water to boil from the heat of the ocean. Unfortunately, steam at this low pressure is not very dense. It would take enormous cylinders to distill a practical amount of fresh water. This arrangement would be both economically and physically impractical.

It is an object of the present invention to provide a system for distilling sea water and other impure aqueous solutions through the use of wave energy.

It is another object of the present invention to provide a scheme for distilling sea water at relatively high temperatures and pressures without generating or needing electricity.

It is still another object of the present invention to provide a sea water distillation apparatus and method that is economically competitive with oil-fired stills.

It is a further object of the present invention to provide a technique for extracting wave energy which maximizes the vacuum imparted to the system per passing wave.

These and other objects and advantages of the present invention will become apparent from a reading of the attached specification and appended claims.

DISCLOSURE OF INVENTION

The present invention provides a system for the distillation of impure aqueous solutions, particularly sea water, comprising: a sea water input conduit, an evaporator communicating with the sea water input conduit, a work extracting device responsive to the wave motion of a body of water and communicating with the evaporator, a condenser communicating with the work extracting device, a distilled water output conduit communicating with the condenser, and a brine solution output conduit communicating with the evaporator. The sea water input conduit delivers sea water from a source to the evaporator. The evaporator operates under a partial vacuum so as to cause the sea water to exceed its Clausius-Clapeyron equilibrium point, thereby causing a portion of the sea water to evaporate. The work extracting device receives the evaporated portion of the sea water and serves to apply a compressive pressure upon this evaporated portion. The condenser receives the compressed evaporated sea water from the work extracting device and serves to convert the evaporated portion into a liquid state. The distilled water output conduit removes the fresh water from the condenser. The brine solution output conduit removes the non-evaporated portion of the sea water from the evaporator.

The work extracting device comprises a first float, a piston-and-cylinder arrangement and a second float. The piston-and-cylinder arrangement comprises a cylinder, a piston slideably engaging the interior of the cylinder and a piston rod extending from the piston. The piston rod couples from the first float such that the piston moves within the cylinder in relation to the wave motion imparted to the first float. The second float is connected to the first float so as to maintain both floats in position relative to one another while allowing these floats to move in response to the wave motion. The cylinder is pivotally mounted to the second float. The piston-and-cylinder arrangement also includes check valves for permitting the unidirectional flow of fluid into and out of the cylinder in response to the motion of the piston within the cylinder.

The evaporator is generally adjacent to the condenser such that the heat developed in the condenser is transferred to the evaporator. The evaporator also includes a pump for extracting the non-evaporated sea water therefrom. This pump communicates with the brine solution output conduit.

A heat exchanger is also included within this system for transferring the heat from the output of this system to the input of the system. The heat exchanger communicates with the sea water input conduit, the distilled water output conduit and the brine solution output conduit.

A supercharger may be connected to the sea water input conduit so as to extract energy from the sea water going into the evaporator and passing from the condenser. This supercharger comprises a hydraulic motor operatively connnected to the distilled water output conduit and the brine solution output conduit. It also comprises a pump operatively connected to the sea water input conduit. The hydraulic motor serves to drive the pump in the supercharger.

BRIEF DESCRIPTION OF THE DRAWINGS

FIG. 1 is a schematical representation of the distillation system of the present invention.

FIG. 2 is a schematical representation of the supercharger of the present invention.

BEST MODE FOR CARRYING OUT THE INVENTION

Figure 3:
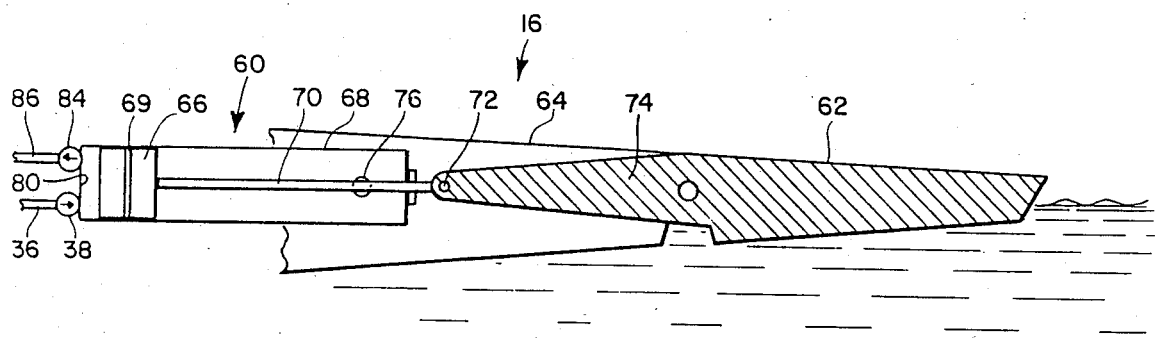
FIG. 3 is a partial cross sectional view in side elevation of the work extractor of the present invention. This shows the work extractor in its intermediate position.

Referring to FIG. 1, there is shown at 10 the system for the distillation of impure aqueous solutions, namely sea water. This sea water distillation system includes a sea water inlet conduit 12, an evaporator 14, a work extraction device 16, a condenser 18, a fresh water outlet conduit 20, and a brine solution outlet conduit 22. Each of these elements interact so as to separate the fresh water from sea water.

Sea water inlet conduit 12 transfers the sea water from some source, such as an ocean, and delivers it to evaporator 14. A heat exchanger 24 is interposed between the source of sea water and evaporator 14. As will be described hereinafter, heat exchanger 24 serves to raise the temperature of the incoming sea water. The sea water is received by chamber 26 of the heat exchanger. The sea water passes from chamber 26 through a pipe 28 to the evaporator 14. A metering valve 30 occurs along pipe 28. This metering valve 30 serves to maintain the level of sea water in the evaporator 14 at the proper height. Metering valve 30 may be float-controlled (not shown) so as to maintain the liquid level at its proper height. Metering valve 30 can be adjustable to permit different flow rates into the evaporator depending upon the requirements of system 10.

Evaporator 14 receives the sea water from conduit 12 through opening 32. Evaporator 14 is a chamber that is maintained under a partial vacuum. The combination of the heat of the entering sea water along with the partial vacuum causes the sea water to evaporate. In other words, this arrangement causes the sea water to exceed its Clausius-Clapeyron equilibrium point and, thus, causes the sea water to become partially gaseous. The evaporated portion of the sea water passes from evaporator 14 through opening 34 toward the work extracting device 16. This evaporated portion will pass through line 36, through check valve 38, and into the accumulator 40 of the work extracting device. Check valve 38 is of the type which will permit only the unidirectional flow of fluid from the evaporator to the accumulator. The remaining brine solution 42 within evaporator 14 is drawn by pump 44 from the evaporator 14 through opening 46 and tubing 48. Brine solution 42 is the remaining impure aqueous solution which is left after the fresh water is evaporated therefrom.

The pump 44 is a wave-powered cylinder. Such a pump is generally described by U.S. Pat. No. 4,309,152 issued on Jan. 5, 1982, to Glenn E. Hagen. This pump 44 receives the brine solution 42 and transmits it through conduit 50 to heat exchanger 24. The brine solution 42 passes from conduit 50 into chamber 52 of the heat exchanger 24. Chamber 52 of the heat exchanger is adjacent chamber 26 such that the heat of the fluid in chamber 52 is transmitted so as to warm the sea water within chamber 26. The brine solution 42 exits the heat exchanger chamber 52 through opening 54 and brine solution outlet conduit 22. The remaining brine solution may be stored for other purposes or may pass to an electrolyzer, to be described hereinafter.

Figure 4:
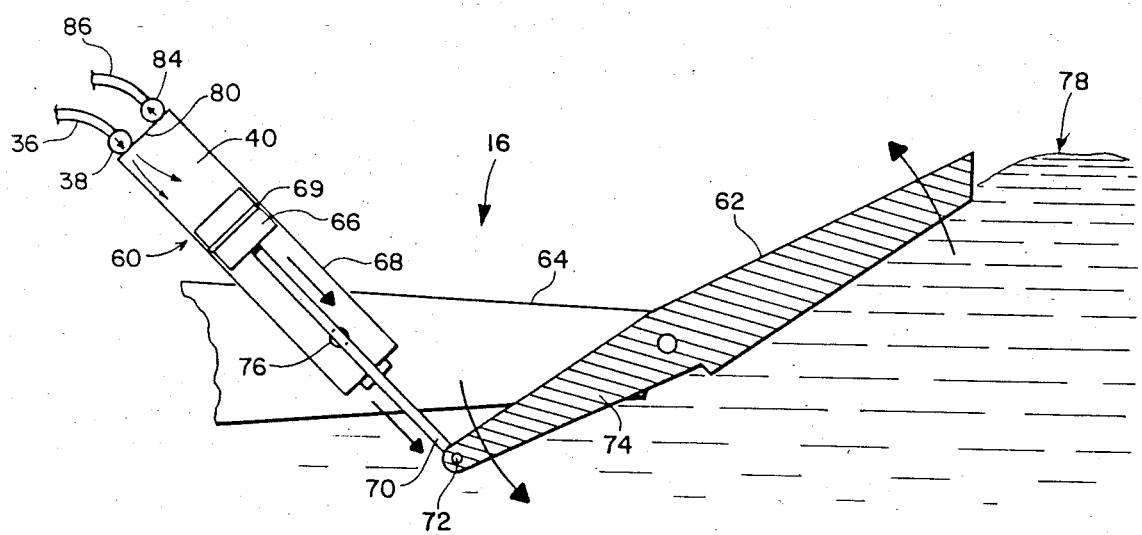
FIG. 4 is a partial cross sectional view in side elevation of the work extractor of the present invention. This view shows the operation of the work extractor in relation to the wave motion.

The work extraction device 16 is more specifically shown in FIGS. 3 and 4. This work extracting device comprises a piston-and-cylinder arrangement 60, a first float 62, and a second float 64. The piston-and-cylinder arrangement 60 has a piston 66 slideably engaging the interior of cylinder 68. An appropriate O-ring seal 69 is placed into a notch about the diameter of piston 66 and interposed between the diameter of piston 66 and the interior of cylinder 68. This O-ring seal 69 serves to maintain a fluid-tight seal about the interior of cylinder 68. Piston rod 70 is affixed to and extends from piston 66. Piston rod 70 extends outwardly from cylinder 68 and is pivotally connected at point 72 to the first float 62. Point 72 occurs on arm 74 extending from first float 62. Cylinder 68 is yoke-mounted in pivotal fashion about point 76 of second float 64. The piston rod 70 is coupled to the first float such that the piston 66 will reciprocate within cylinder 68 in relation to the wave motion imparted by wave 78 onto first float 62. First float 62 and second float 64 are connected to each other so as to maintain each of these floats in position relative to one another while allowing first float 62 and second float 64 to move in response to the wave motion. First float 62 and second float 64 may be part of a Hagen array of floats. Such a Hagen array comprises a plurality of differing sized floats with each of the float sizes chosen to allow the floats to dynamically couple to the wave length of the wave motion. This type of Hagen array is described in greater detail in U.S. Pat. No. 4,077,213 and U.S. Pat. No. Re. 31,111.

The method of mounting work extraction device 16 offers a number of advantages relative to the receiving of and use of wave energy. First, this method of mounting insures that piston 66 bottoms out against the head of cylinder 68 in the middle of each stroke. This action of bottoming out causes the high vacuum necessary to start the process of this invention. Secondly, through this method of mounting, this bottoming out occurs regardless of the amplitude of the impinging wave 78. Finally, this method of mounting yields a proportional extraction of energy. The yoke-mounting method is such that only a small resistance is offered against small-amplitude waves, while a high resistance, and resulting high energy extraction, is in effect for higher amplitude waves.

The evaporator portion of the sea water flows into accumulator 40 of the work extraction device 16. Accumulator 40 is the area formed between end 80 of cylinder 68 and bottom 82 of piston 66. The evaporated portion of the sea water is drawn from evaporator 14 into accumulator 40 through the motion of the piston 66, as shown in FIG. 4. The first float 62 reacts to waves 78 such that arm 74 of first float 62 pulls the piston rod 70 away from end 80 of cylinder 68. When the first float returns to a neutral or level position, as shown in FIG. 3, piston 66 bottoms at end 80 of cylinder 68. When the piston 66 bottoms against end 80, the evaporated portion of the sea water is forced through check valve 84 and into line 86. This evaporated portion then flows through opening 88 into condenser 18. The compression of the steam within the cylinder heats the steam and causes it to return to the condenser at a higher temperature than when it left the evaporator. The temperature of the evaporated portion within condenser 18 serves to transfer heat to evaporator 14. As stated previously, evaporator 14 and condenser 18 are adjacent to each other such that any elevated temperature about condenser 18 is transferred to evaporator 14. The evaporated portion passes from condenser 18, through pipes 90, and into chamber 92 of heat exchanger 24. It should be noted that the interaction of condenser 18 and heat exchanger 24 causes the evaporated portion to become transformed into its fresh water liquid state. In other words, the evaporated portion is beneath its Clausius-Clapeyron equilibrium point. This causes the steaming evaporated portion to condense into a liquid. Since chamber 92 of heat exchanger 24 is adjacent to chamber 26 of the heat exchanger, the cooler temperature of the sea water within chamber 26 will assist in condensing the evaporated portion. Similarly, the higher temperature of the evaporated portion with chamber 92 will serve to increase the temperature of the sea water within chamber 26. The resultant fresh water exits chamber 92 through water outlet conduit 20. The fresh water flowing through the system may be accumulated in a fresh water reservoir or may pass to an electrolyzer, to be described hereinafter.

The operation of the system of the present invention is described hereinafter. While this is a continuous flow system, the operation will be described from an imaginary start point. The sea water flows from some source through conduit 12 into chamber 26 of heat exchanger 24. Chamber 26 is surrounded by hot chambers 52 and 92. Chambers 52 and 92 serve to bring the temperature of the sea water to a temperature only slightly cooler than 100 degrees C. The now-warmed sea water passes from chamber 26 through pipe 28 and into evaporator 14. Evaporator 14 is maintained in a partial vacuum such that the sea water is caused to exceed its Clausius-Clapeyron equilibrium point. When the present system is in equilibrium, the evaporator is only slightly cooler than 100 degrees C. and its pressure is only slightly less than atmospheric. The evaporator 14 causes the sea water to boil, thereby creating an evaporated portion. The evaporated portion is drawn into accumulator 40 of piston-and-cylinder arrangement 60 through the wave motion acting on first float 62. This motion is shown in FIG. 4.

When incoming wave 78 lifts first float 62 toward its crest position, the arm 74 swings downward, tipping the cylinder 68 upward into the position shown in FIG. 4, and pulling out the piston rod 70. This operation creates the suction stroke of the work extracting device. Steam is thereby drawn in through check valve 38. In this arrangement, it does not matter where the suction stroke terminates; the important thing is that it starts from zero volume and can therefore create as high a vacuum as necessary to cause the sea water to boil. This action of piston-and-cylinder assembly creates the partial vacuum within evaporator 14. As the wave crest subsides, the float 62 returns to its neutral postion, as shown in FIG. 3, thereby forcing the piston rod in to form the compression stroke. Then, as the wave trough arrives, the float 62 will be dropped downward, the cylinder tipped downward and a resultant suction stroke is created. This action is enhanced by the ability of the cylinder to pivot about second float 64. After this suction stroke, another compression stroke is created as the float 62 rises back to its neutral postion. In this arrangement there are two compression strokes to each full wave cycle.

On the compression stroke, the piston 66 transfers almost an entire cylinder of steam from the evaporator 14 to the condenser 18. This steam exits through check valve 84, through line 86, and into condenser 18. In this arrangement, the cylinder is doing the work on the system. At the start of the compression stroke, the steam is being adiabatically compressed from the evaporator vacuum up to atmospheric. This heats the steam, so that it returns to the condenser 18 at a higher temperature than it leaves the evaporator 14. This increase in temperature is held captive by the heat exchanger. In other words, as the brine solution and fresh water condensate become hotter, the incoming sea water also gets hotter. As a result, the pressures and temperatures both increase until an equilibrium is reached where the evaporator is only slightly cooler than 100 degrees C. and its pressure only slightly less than atmospheric. The entire system operates without the need for electrical input.

The fresh water flows from the heat exchanger 24 through fresh water outlet conduit 20. This fresh water may be put to any useful purpose, as desired. The brine solution that remains is pumped by pump 44 from evaporator 14 outwardly through heat exchanger 24 and through brine solution outlet conduit 22. Since pump 44 is similarly wave driven, there is no need for electrical power to operate this pumping system.

An addition to this system which further facilitates its practicality is the addition of a supercharger, as shown schematically in FIG. 2. This supercharger assists in extracting energy from the sea water going from atmospheric pressure into the vacuum from the evaporator 14 and from the fresh water going from the pressure of the condenser 18 down to atmospheric pressure. This extracted energy may then be used to power pump 44 so as to remove the brine from the vacuum of the evaporator. In the embodiment as shown in FIG. 1, at the right hand end of the heat exchanger 24, the input and output are at atmospheric pressure. FIG. 2 shows the arrangement of motors and pumps for extracting energy. Specifically, pump 44 is operatively connected to the brine solution outlet conduits 48 and 50. Hydraulic motor 102 is operatively connected to the fresh water outlet conduit 20. Hydraulic motor 104 is operatively connected to the sea water inlet conduit 12. The movement of the sea water into the system and the fresh water out of the system serves to drive hydraulic motors 102 and 104. The hydraulic motors, in turn, drive a pump 44 for the removal of the brine solution from the vacuum of the evaporator.

This system should run itself with energy to spare. For example, if two-thirds of the incoming seawater is to be evaporated, then the brine to be pumped out will be only one-third the volume of the incoming seawater driving the motor. In addition, since the condenser is at a positive pressure from the start, the fresh water exiting can drive the second motor 102 so as to further help make pumping system self-energizing.

In summary, the system of the present invention has a wide variety of advantages and uses. It is very effective as a means for distilling sea water. The system is cost effective and efficient. Since it is a closed system, there is no need for external energy input (other than the motion of the waves of a body of water).

The foregoing disclosure and description of the invention is illustrative and explanatory thereof, and various changes in the method steps as well as in the details of the illustrated apparatus may be made within the scope of the appended claims without departing from the true spirit of the invention.

I claim:

1. A work extracting device driven by the wave motion of a fluid, said wave motion having an amplitude spectrum and a wave length spectrum comprising:
    a first float having a density such that said first float floats in said fluid and moves in response to said wave motion;
    a cylinder;
    a piston slideably engaging the interior of said cylinder;
    a piston rod fastened and extending from said piston; and
    a second float connected to said first float so as to maintain said first and said second floats in position relative to one another while allowing said first and second floats to move in response to said wave motion, said cylinder being pivotally mounted to said second float, said first float having an arm fixedly connected to and extending longitudinally from said first float a distance beyond the point of connection between said first float and said second float, said piston rod pivotally connected about the end of said arm of said first float, said end of said arm being opposite said first float and beyond the point of connection between said first float and said second float.

2. The device of claim 1, said device further comprising:
    work receival means connected to said cylinder for transferring the energy of the movement of said piston within said cylinder.

* * * * *